(12) United States Patent
Iwasaki et al.

(10) Patent No.: US 6,504,902 B2
(45) Date of Patent: Jan. 7, 2003

(54) X-RAY OPTICAL DEVICE AND MULTILAYER MIRROR FOR SMALL ANGLE SCATTERING SYSTEM

(75) Inventors: Yoshio Iwasaki, Tokyo (JP); Boris Verman, Bloomfield, MI (US); Licai Jiang, Rochester Hills, MI (US)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 09/829,753

(22) Filed: Apr. 10, 2001

(65) Prior Publication Data

US 2001/0028699 A1 Oct. 11, 2001

(30) Foreign Application Priority Data

Apr. 10, 2000 (JP) ........................................ 2000-108287

(51) Int. Cl.[7] .................................................. G21K 1/06
(52) U.S. Cl. ........................................... 378/84; 378/85
(58) Field of Search ............................ 378/84, 85, 156, 378/147, 160

(56) References Cited

U.S. PATENT DOCUMENTS

| | | | | |
|---|---|---|---|---|
| 4,525,853 A | | 7/1985 | Keem et al. | |
| 5,008,911 A | * | 4/1991 | Harding | 378/86 |
| 5,127,028 A | * | 6/1992 | Wittry | 378/84 |
| 6,014,423 A | * | 1/2000 | Guttman et al. | 378/85 |
| 6,041,099 A | * | 3/2000 | Gutman et al. | 378/85 |
| 6,249,566 B1 | * | 6/2001 | Hayashi et al. | 378/85 |

* cited by examiner

*Primary Examiner*—Robert H. Kim
*Assistant Examiner*—Irakli Kiknadze
(74) *Attorney, Agent, or Firm*—Jordan and Hamburg LLP

(57) ABSTRACT

A multilayer mirror 1 that has elliptical reflection faces and provides a divergent angle δ of X-rays, is included. The elliptical reflection faces of the multilayer mirror 1 have two focal points. When an X-ray source 2 is arranged at one focal point A, and X-rays that are diverged from the X-ray source 2 are reflected at the multilayer mirror 1, the reflected X-rays converge on another focal point B. The X-ray source 2 is arranged at one focal point A of the multilayer mirror 1. Additionally, a distance L2 from the center of the reflection faces of the multilayer mirror 1 to another focal point B (in other words, convergent point of reflected X-rays) is set to make a convergent angle θc of X-rays at the focal point B nearly twice as great as the divergent angle δ. With the above-noted configuration, both small angle resolution and intensity of incident X-rays to a sample may be optimized, and small angle scattering may be performed with high precision.

8 Claims, 4 Drawing Sheets

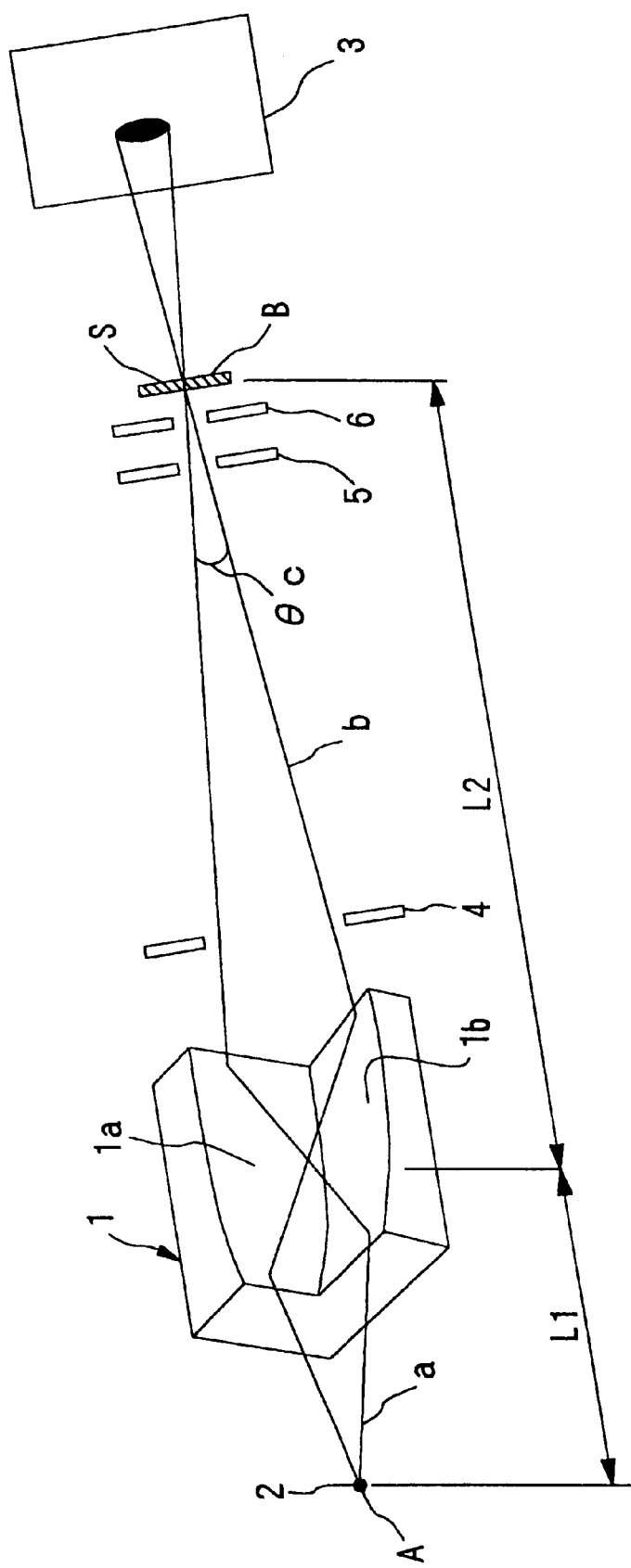

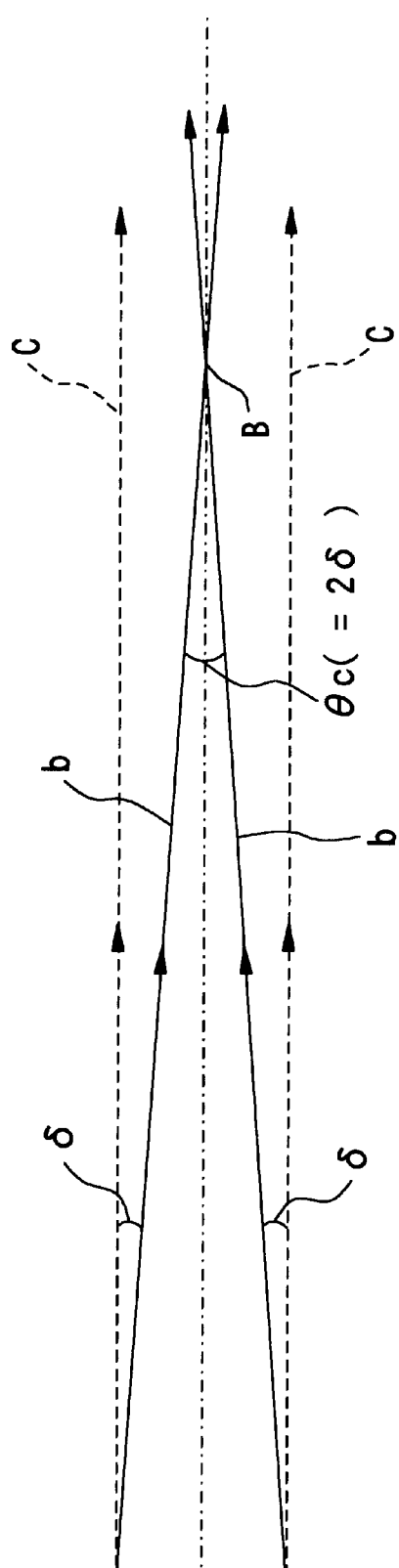

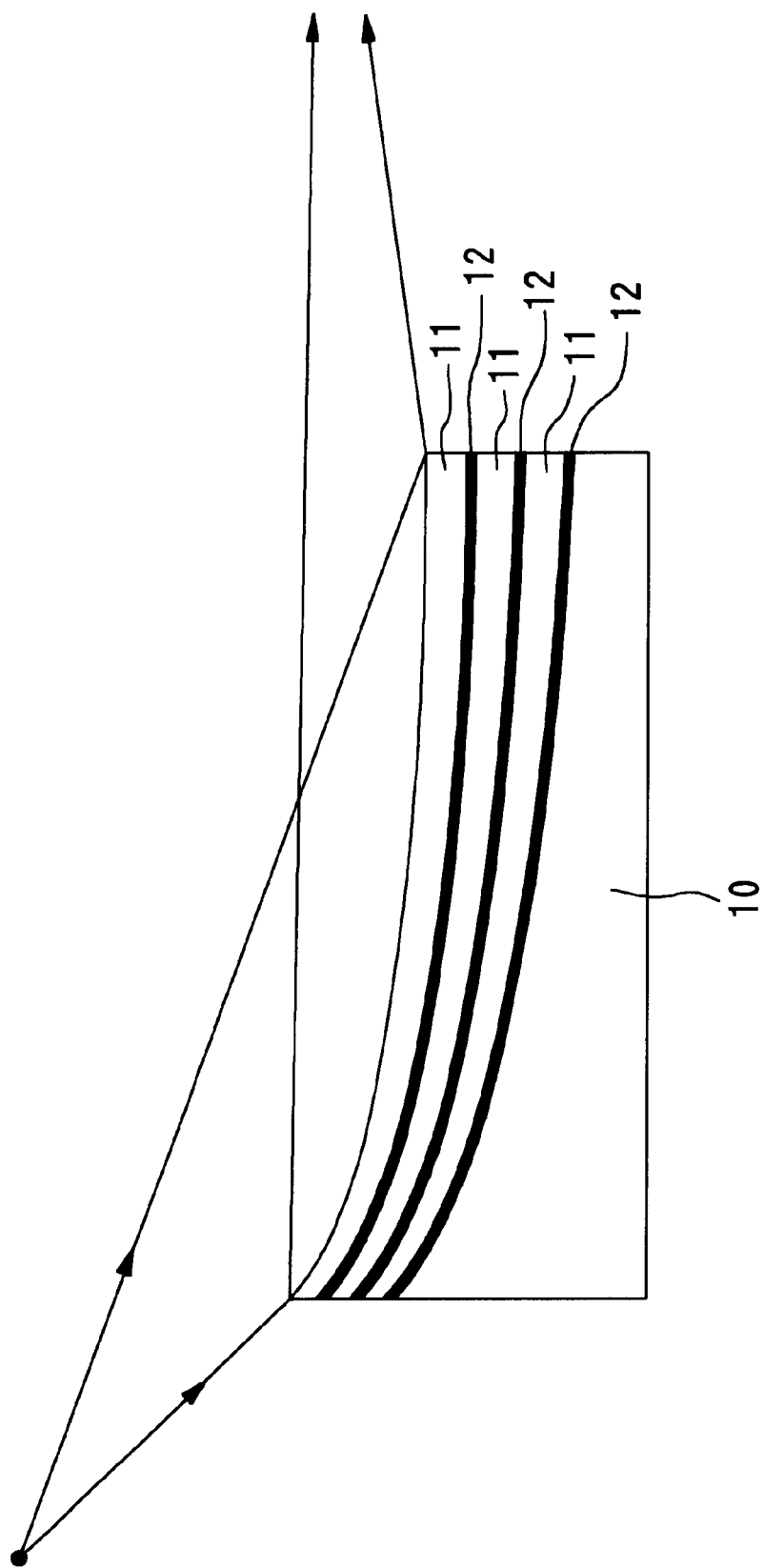

X-RAY OPTICAL DEVICE AND MULTILAYER MIRROR FOR SMALL ANGLE SCATTERING SYSTEM

BACKGROUND OF THE INVENTION

1. Field of the Invention

The present invention relates to an X-ray optical device and a multilayer mirror for use in small angle scattering of a material, to converge X-rays radiated from an X-ray source on a sample.

2. Description of the Related Art

Depending on a material, X-rays are sometimes scattered in a small angle region (for instance, around 0° to 5°) with an optical axis of incident X-rays at the center, when X-rays are irradiated.

For instance, when a material has fine particles of about 10 to 1000 angstroms or a region of inhomogeneous density in the equivalent size thereto, scattering which is diffused in an incident direction of X-rays, the so-called small angle scattering, occurs. The small angle scattering gets broader as particles become smaller, regardless of an inner structure of the particles. This scattering exits without being dependent on whether a material is crystalline and amorphous. The scattering is observed at a scattering angle, in other words, in a small angle region where an angle from an optical axis of incident X-rays is about 0° to 5°.

For a small angle region, the diffraction when a lattice spacing is extremely large like in protein crystals, X-ray diffraction in case of the so-called long-period structure in which crystalline and amorphous are periodically arranged in a fiber sample, and so forth are observed in a small angle region.

X-rays observed in a small angle region, including the diffuse scattering, and diffraction, are generally called small angle scattering. By the small angle scattering, various characteristics of a sample may be determined.

For the small angle scattering, a total reflection mirror having a cylinder face is conventionally used for an optical system to converge X-rays on a sample. In a convergent optical system using this type of a total reflection mirror, a distance from the total reflection mirror as the center to an X-ray source (X-ray focal point) is equal to a distance from the mirror to a convergent point of X-rays reflected at the total reflection mirror.

As the distance from the total reflection mirror to a convergent point of X-rays increases, a convergent angle of x-rays becomes smaller. Accordingly, small angle resolution improves, which is preferable.

However, when the distance from the total reflection mirror to a convergent point of X-rays is widened to improve small angle resolution, the distance from an X-ray source (X-ray focal point) to the total reflection mirror also increases in proportion to the distance. Additionally, since X-rays attenuate more as the X-ray source is set farther away from the total reflection mirror, the intensity of incident X-rays to a sample declines.

Thus, the conventional optical system for use in small angle scattering has a problem in that either small angle resolution or intensity of incident X-rays to a sample is sacrificed.

In order to solve this problem, an optical system using a special mirror, called a toroidal mirror, was considered. However, this toroidal mirror having a complex shape is extremely difficult to manufacture, and is impractical.

SUMMARY OF THE INVENTION

Accordingly, it is an object of the present invention to optimize both small angle resolution and intensity of incident X-rays to a sample in small angle scattering.

In order to achieve the above object, an X-ray optical device for small angle scattering system relating to the present invention includes a multilayer mirror providing a divergent angle δ of reflected X-rays, and an X-ray source to radiate X-rays. The multilayer mirror has at least the following (a) and (b) conditions:

(a) reflection faces are elliptic having two focal points A and B; and (b) a distance from the center of the reflection faces to the focal point B (convergent point of reflected X-rays) is set to provide a convergent angle θc of X-rays at the focal point B that is almost twice as great as the divergent angle δ, when X-rays are irradiated to the reflection faces by arranging the X-ray source at the focal point A.

With such a configuration, a distance from the center of the reflection faces of the multilayer mirror to the X-ray source becomes short, and the attenuation of X-rays diverging from the X-ray source is inhibited. A sample may be arranged at a random location along the path of X-rays reflected at the multilayer mirror. However, if the sample is arranged at the other focal point B of the multilayer mirror, an irradiation area of X-rays would be extremely small, and small angle scattering would be performed with a small amount of sample.

With a small amount of sample, a capillary column or the like which absorbs little X-rays, may be used as a sample container. Scatter X-rays of higher intensity from the sample may be obtained. Small angle scatter X-rays from the sample are detected by an X-ray detector provided downstream from a convergent point.

When X-rays a are entered to a surface of a multilayer mirror 1 at an incident angle θ as shown in FIG. 2A, X-rays b are reflected at an angle of 2θ with respect to the incident X-rays a. However, due to surface roughness of the multilayer mirror 1, etc. X-rays c diverge at a minute angle δ with the reflected X-rays b as the center.

In the present invention, the divergent angle δ of X-rays at the multilayer mirror indicates a divergent angle δ of the reflected X-rays c, and is equivalent to ½ of a full width of a rocking curve. However, the definition of the full width of a rocking curve is difficult to make, and is not standardized. In the present invention, it is defined that the full width of a rocking curve is twice as wide as a full width at half maximum of the peak of the rocking curve. The divergent angle δ is assumed to be the full width at half maximum of the peak. When a standardized definition is established for the full width of a rocking curve, the divergent angle δ of the present invention may be derived on the basis of this definition.

A full width at half maximum of the peak of a rocking curve may be derived as follows. Specifically, as shown in FIG. 2B, the X-rays a are entered to a surface of the multilayer mirror 1 from an X-ray source 2 at the incident angle θ, and an X-ray detector 3 is arranged at an angle of 2θ with respect to the incident X-rays a. When the multilayer mirror 1 is ω-rotated only by a minute angle from this state, an X-ray profile I may be obtained as shown in FIG. 2C. The X-ray profile I is called a rocking curve. A width δ at ½ of the peak intensity thereof is a full width at half maximum of the peak of the rocking curve.

The convergent angle θc of the multilayer mirror indicates a convergent angle of a whole X-ray flux that is reflected at the mirror and is converged on one point. Since the divergent angle δ of X-rays is minute at the multilayer mirror, the convergent angle θc becomes small even if the convergent angle θc is twice as great as the divergent angle δ. Accordingly, reflected X-rays at the downstream from the convergent point diverge in a small angle.

Furthermore, since the convergent angle θc of the multilayer mirror is set as above, almost parallel loci are formed by the reflected X-rays c that appear at the divergent angle δ (≈θc/2) around the reflected X-rays b converging at the convergent angle θc as shown in FIG. 3.

Accordingly, an X-ray detector may be arranged at a location apart from the convergent point of X-rays (in other words, sample location), and high small angle resolution may be obtained.

Moreover, it is preferable in the present invention that a first slit and a second slit are arranged along an optical axis of X-rays that are reflected at the multilayer mirror, to prevent the X-rays from diverging, and a third slit is arranged near another focal point (convergent point of X-rays) of the multilayer mirror to shield parasitic scattering from the multilayer mirror.

It is a well-known fact that parasitic scattering from a multilayer mirror negatively affects small angle scattering. According to the optical device of the present invention, since a distance between the multilayer mirror and a sample is kept sufficiently long, the effects of parasitic scattering are small. Furthermore, by inserting the third slit, parasitic X-ray scattering may be shielded better. When a sample is arranged at another focal point (convergent point of X-rays) of the multilayer mirror, the third slit may be arranged near the convergent point. Thus, a slit width may be reduced without attenuating the intensity of X-rays, and parasitic scattering may be shielded while maintaining X-ray intensity.

As explained above, according to the optical device for small angle scattering system of the present invention, both small angle resolution and intensity of incident X-rays to a sample may be optimized, and small angle scattering measurement may be performed at high precision.

BRIEF DESCRIPTION OF THE DRAWINGS

FIG. 1 is a block diagram of an optical device for small angle scattering system relating to an embodiment of the present invention;

FIG. 3 is a diagram, showing relations between a convergent angle and a divergent angle of X-rays reflected at the multilayer mirror; and FIG. 4 is a cross-sectional view, showing a structure of the multilayer mirror having elliptical faces.

DESCRIPTION OF THE PREFERRED EMBODIMENT

Figure 2A:
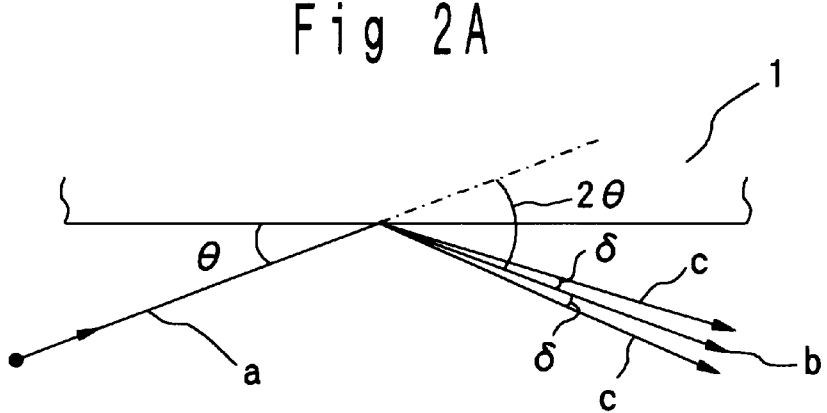
FIG. 2A is a diagram to explain a divergent angle of a multilayer mirror.
Figure 2B:
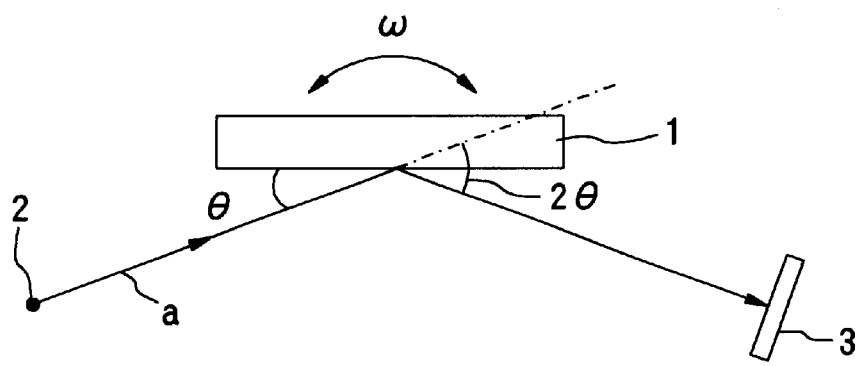
FIG. 2B is a diagram, showing a general technique to measure a rocking curve.
Figure 2C:
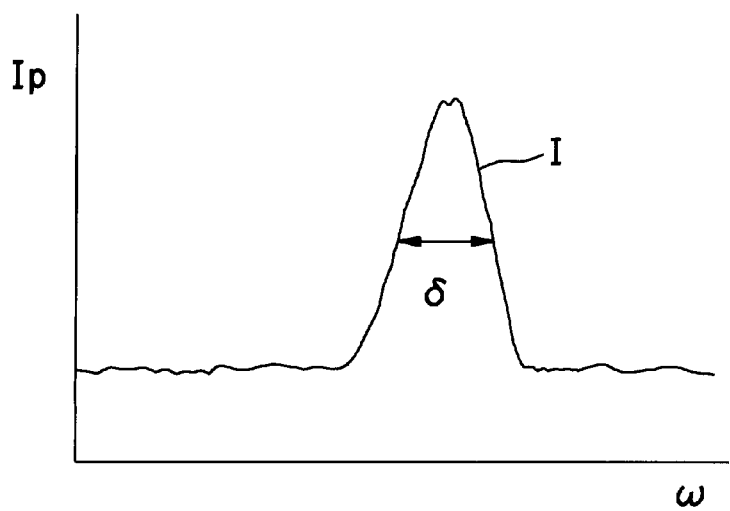
FIG. 2C is a graph, showing the rocking curve and the full width at half maximum of the peak thereof.

A preferred embodiment of the present invention will be explained by referring to figures.

FIG. 1 is a block diagram of an optical device for small angle scattering system relating to an embodiment of the present invention.

As shown in FIG. 1, the optical device for small angle scattering system of the present embodiment has an X-ray source 2, a multilayer mirror 1, and a first, second, and third slits 4, 5, 6. The X-ray source 2 uses an X-ray generator of a high output that radiates X-rays from a pointed focus. The multilayer mirror 1 is constituted of a first reflection part 1a and a second reflection part 1b that are orthogonal to each other.

The first and the second reflection parts 1a, 1b for use in the present embodiment have a multilayer structure. As shown in FIG. 4, layers 11 of a material having a large atomic number (for instance, nickel Ni, tungsten W or platinum Pt) and layers 12 of a material having a small atomic number (for example, carbon C or silicon Si) are alternately laminated on a surface of a substrate 10. Each layer 11, 12 has a thickness of several to dozens nm, and is formed at a period of 100 to 200 layers. Additionally, in consideration of the effects due to X-ray refraction at each layer 11, 12, each layer 11, 12 is inclined by a predetermined angle with respect to a surface of the substrate 10. Furthermore, each reflection part 1a, 1b is curved in the same elliptic face so as to converge reflected X-rays on one point.

The X-ray source 2 is arranged at one focal point A of the above-noted multilayer mirror 1. A distance L2 from the center of the reflection faces of the multilayer mirror 1 to another focal point B (convergent point of reflected X-rays) is set so as to make a convergent angle θc of X-rays at the focal point B almost twice as great as a divergent angle δ of the multilayer mirror 1 (in other words, full width at half maximum of the peak of a rocking curve). This setting may be achieved by adjusting the structure of the multilayer mirror 1, for instance, the elliptical face shapes, materials, and multilayer structures.

By such a setting, a distance L1 from the center of the multilayer mirror 1 to the X-ray source 2 is made sufficiently shorter than the distance L2 from the center to another focal point B (L1<<L2).

For example, it is assumed that the divergent angle δ of X-rays reflected at the multilayer mirror 1 is 0.05°, and the solid angle α of incident X-rays a to the multilayer mirror 1 is 0.27°. The distance L1 from the center of the multilayer mirror 1 to the X-ray source 2 is assumed to be 250 mm. When the distance L2 from the center of the multilayer mirror 1 to the focal point B (convergent point) is set at 700 mm, the convergent angle θc of the reflected X-rays b becomes nearly twice as great as the divergent angle δ as shown in the following formula. Thus, a preferable arrangement may be obtained.

$$\theta c = \alpha \times L1/L2 = 0.27 \times 250/700 \approx 0.096 \approx 2\delta$$

The first and the second slits 4, 5 are provided to prevent the X-rays B reflected at the multilayer mirror 1 from diverging. The third slit 6 shields parasitic scattering from the multilayer mirror 1, and is provided near the convergent point B of X-rays. It is preferable to use a quadrantal slit having slit widths that are variable in two axial directions, for the third slit 6.

It is preferable to arrange a sample S at the convergent point (focal point B) of the X-rays b reflected at the multilayer mirror 1, and an X-ray detector 3 is installed at the downstream thereof. An imaging plate (IP) is used for the X-ray detector 3 so as to detect small angle scatter X-rays which diverge from the sample S, in a wide range.

In the optical device for small angle scattering system of the present embodiment, the X-rays a radiated from the X-ray source 2 enter to the multilayer mirror 1. However, since the distance L1 from the X-ray source 2 to the multilayer mirror 1 is set short as described above, the X-ray intensity a hardly attenuate within this distance and high X-ray intensity may be kept.

The X-rays a that entered from one end to the multilayer mirror 1 are alternately reflected between the first reflection part 1a and the second reflection part 1b and output to the other end. Then, the reflecting X-rays b output from the multilayer mirror 1 are converged at the convergent angle θc.

As the convergent angle θc is adjusted to nearly twice that of the divergent angle δ herein, almost parallel beam are formed by the X-rays c reflected at the divergent angle δ around the reflected X-rays b as described above (see FIG. 3). Moreover, the convergent angle θc set as above is a small angle as described above.

Accordingly, the X-ray detector 3 may be arranged at a location apart from the convergent point B of X-rays (in other words, sample location), and high small angle resolution may be obtained.

When the reflected X-rays b are irradiated to the sample S thereby, small angle scattering of X-ray are taken out from the sample S. The small angle scattering of X-ray are detected by the X-ray detector 3 (IP) at the downstream.

Additionally, when a distance between the sample S and the X-ray detector 3 is widened, air scattering of X-rays increases and a background rises. Accordingly, S/N ratios in measurement may become worse. In order to solve this problem, it is preferable to cover a gap between the sample S and the X-ray detector 3 with a vacuum pass. Furthermore, for the same reason, it is desirable to cover each gap of the slits 4, 5, 6 therebetween with a vacuum pass.

What is claimed is:

1. An X-ray optical device for small angle scattering system, comprising a multilayer mirror providing a divergent angle δ of reflected X-rays, and an X-ray source to radiate X-rays, wherein the multilayer mirror has at least the following conditions (a) and (b):

(a) reflection faces are formed elliptically to have two focal points A, B; and (b) a distance from a center of the reflection faces to the focal point B is set to provide a convergent angle θc of X-rays at the focal point B that is nearly twice as great as the divergent angle δ, when the X-ray source is arranged at the focal point A to irradiate X-rays to the reflection faces.

2. The optical device according to claim 1, wherein the reflection faces are formed of a first reflection part and a second reflection part that are orthogonal to each other and have a multilayer structure, and the multilayer mirror is configured to converge X-rays reflected at each reflection part on the focal point B.

3. The optical device according to claim 2, wherein the first reflection part and the second reflection part have a multilayer structure in which thin layers formed of a material having a large atomic number and thin layers formed of a material having a small atomic number are alternately laminated on a surface of a substrate.

4. The optical device according to claim 1, wherein a sample is arranged at the focal point B of the multilayer mirror.

5. The optical device according to claim 4, wherein a first slit and a second slit are arranged along an optical axis of X-rays reflected at the multilayer mirror to prevent the diverging X-rays, and a third slit is arranged near another focal point B of the multilayer mirror to shield parastic scattering from the multilayer mirror.

6. A multilayer mirror for small angle scattering, providing a divergent angle δ of reflected X-rays and having at least the following conditions (a) and (b):

(a) reflection faces are formed elliptically to have two focal points A, B; and (b) a distance from a center of the reflection faces to the focal point B is set to provide a convergent angle θc of X-rays at the focal point B that is nearly twice as great as the divergent angle δ, when X-rays are irradiated from the focal point A to the reflection faces.

7. The multilayer mirror according to claim 6, wherein the reflection faces are formed of a first reflection part and a second reflection part that are orthogonal to each other and have a multilayer structure, and the multilayer mirror is configured to converge X-rays reflected at each reflection part on the focal point B.

8. The multilayer mirror according to claim 7, wherein the first reflection part and the second reflection part have a multilayer structure in which thin layers formed of a material having a large atomic number and thin layers formed of a material having a small atomic number are alternately laminated on a surface of a substrate.

* * * * *